(12) United States Patent
Bittner

(10) Patent No.: US 11,683,654 B2
(45) Date of Patent: *Jun. 20, 2023

(54) AUDIO CONTENT FORMAT SELECTION

(71) Applicant: Spotify AB, Stockholm (SE)

(72) Inventor: Rachel Bittner, Brooklyn, NY (US)

(73) Assignee: Spotify AB, Stockholm (SE)

( * ) Notice: Subject to any disclaimer, the term of this patent is extended or adjusted under 35 U.S.C. 154(b) by 43 days.

This patent is subject to a terminal disclaimer.

(21) Appl. No.: 17/325,493

(22) Filed: May 20, 2021

(65) Prior Publication Data

US 2021/0345056 A1  Nov. 4, 2021

Related U.S. Application Data

(63) Continuation of application No. 16/156,674, filed on Oct. 10, 2018, now Pat. No. 11,044,569.

(30) Foreign Application Priority Data

Dec. 19, 2017  (EP) .................................... 17208426

(51) Int. Cl.
*H04S 3/00* (2006.01)
*H04S 7/00* (2006.01)
(Continued)

(52) U.S. Cl.
CPC ......... *H04S 3/008* (2013.01); *H04N 21/2181* (2013.01); *H04N 21/2393* (2013.01);
(Continued)

(58) Field of Classification Search
CPC . H04S 3/00; H04S 3/008; H04S 3/004; H04S 7/304; H04S 7/00; H04S 2420/01;
(Continued)

(56) References Cited

U.S. PATENT DOCUMENTS 5,917,916 A * 6/1999 Sibbald .................. H04S 1/002
381/74
6,035,339 A    3/2000 Agraharam
(Continued)

FOREIGN PATENT DOCUMENTS

WO    2012/125855 A1    9/2012

OTHER PUBLICATIONS

Extended European Search Report from European Application No. 17208426.1, dated Apr. 24, 2018.
(Continued)

*Primary Examiner* — Leshui Zhang
(74) *Attorney, Agent, or Firm* — Merchant & Gould P.C.

(57) ABSTRACT

Systems, devices, apparatuses, components, methods, and techniques for providing media content to a media playback system are provided. The techniques provide for determining whether a playback system is connected, or otherwise associated with, a playback device suitable for 3D audio playback. Upon determining that a playback system is or is not connected or otherwise associated with a playback device suitable for 3D audio playback, audio content in a corresponding format may then be transferred and/or played by a requesting system. In some examples, one or more
(Continued)

filters may be applied to requested audio content to compensate for determined user head movement and/or to create simulated 3D audio from generic two-channel recording.

20 Claims, 6 Drawing Sheets

(51) Int. Cl.
    *H04N 21/239*     (2011.01)
    *H04N 21/2343*     (2011.01)
    *H04N 21/218*     (2011.01)

(52) U.S. Cl.
    CPC ....... *H04N 21/23439* (2013.01); *H04S 3/004* (2013.01); *H04S 7/304* (2013.01); *H04S 2420/01* (2013.01)

(58) Field of Classification Search
    CPC ......... H04N 21/23439; H04N 21/2393; H04N 21/2343; H04N 21/2181; H04N 21/218; H04N 21/2387; H04N 21/238; H04N 21/44012; H04N 21/43; H04N 21/44; G06F 3/165; G06F 3/0482; G06F 3/011; H04L 65/764; H04L 65/60; H04L 65/612; H04L 65/70; H04L 65/762
    USPC ... 381/17, 18–23, 309, 310, 311, 26, 27, 61, 381/63, 66, 23.1, 312–331, 74, 75, 79, 381/80, 81, 85, 334, 94.9, 96, 97, 98, 99, 381/100, 101, 102, 103, 104, 105, 106, 381/107, 108, 110, 111, 116, 117, 118, 381/119, 120, 123; 700/94
    See application file for complete search history.

(56) References Cited

U.S. PATENT DOCUMENTS

| | | | |
|---|---|---|---|
| 6,960,713 B2* | 11/2005 | Futohashi | H04M 19/041 |
| | | | 84/649 |
| 11,044,569 B2 | 6/2021 | Billner | |
| 2007/0147630 A1* | 6/2007 | Chiloyan | H04R 1/1033 |
| | | | 381/11 |
| 2007/0297625 A1 | 12/2007 | Hjort | |
| 2008/0058972 A1* | 3/2008 | Yoneda | G10L 19/173 |
| | | | 381/79 |
| 2008/0228925 A1 | 3/2008 | Armstrong | |
| 2008/0260169 A1* | 10/2008 | Reuss | H04R 1/10 |
| | | | 381/74 |
| 2009/0279722 A1* | 11/2009 | Lin | H04R 5/04 |
| | | | 381/311 |
| 2010/0290636 A1 | 11/2010 | Mao et al. | |
| 2014/0229579 A1* | 8/2014 | Johnson | G06F 16/70 |
| | | | 709/219 |
| 2015/0078573 A1 | 3/2015 | Nicholson | |
| 2015/0092965 A1* | 4/2015 | Umminger | H04S 7/304 |
| | | | 381/310 |
| 2016/0241980 A1* | 8/2016 | Najaf-Zadeh | G06T 19/006 |
| 2018/0098173 A1 | 4/2018 | van Brandenburg | |
| 2018/0314486 A1 | 11/2018 | Edry | |

OTHER PUBLICATIONS

European Communication pursuant to Article 94(3) EPC in Application 17208426.1, dated Apr. 8, 2019, 5 pages.
European Summons to Attend Oral Proceedings in Application 17208426.1, mailed Apr. 23, 2020, 7 pages.
European Minutes from Oral Proceedings in Application 17208426.1, mailed Jan. 14, 2021, 4 pages.

* cited by examiner

AUDIO CONTENT FORMAT SELECTION

CROSS REFERENCE TO RELATED APPLICATIONS

This application is a Continuation of U.S. patent application Ser. No. 16/156,674, filed Oct. 10, 2018, which claims the benefit of European Application No. 17208426.1, filed Dec. 19, 2017, and which applications are hereby incorporated by reference in their entireties. To the extent appropriate, a claim of priority is made to each of the above-disclosed applications.

BACKGROUND

An almost limitless variety of audio content is available to listeners at the touch of a button, or frequently the input of a voice command, given the presence of countless audio content distributors and services that provide access to that content. Examples of audio content include songs, albums, podcasts, audiobooks, promotional clips, etc. However, audio content is typically only transferred to listeners and their playback devices in a basic two-channel format in which it was originally recorded, without taking into account the playback capabilities of those devices to providing more immersed and interactive listening experiences to audio content consumers.

SUMMARY

In general terms, this disclosure is directed to providing audio content to a media playback system in a format that takes advantage of the media playback system's capabilities. Various aspects are described in this disclosure, which include, but are not limited to, the following aspects.

One aspect is a method for providing media content to a media playback system. The method includes: receiving, from the media playback system, a request for media content; determining, based on one or more factors associated with the request, whether the media playback system comprises a three-dimensional audio playback system; sending, to the media playback system, three-dimensional audio content when the media playback system is determined to comprise a three-dimensional audio playback system; and sending, to the media playback system, non-three-dimensional audio content when the media playback system is not determined to comprise a three-dimensional audio playback system.

In accordance with an embodiment of the method of the present invention, there is provided a method performed by a server computing device for providing media content to a media playback system comprising a media playback device. The method comprises receiving, from the media playback system, a request for media content. The method also comprises determining, based on one or more factors associated with the request, whether the media playback system comprises a three-dimensional audio playback system. The method also comprises sending, to the media playback system, three-dimensional audio content when the media playback system is determined to comprise a three-dimensional audio playback system, and/or sending, to the media playback system, non-three-dimensional audio content when the media playback system is determined not to comprise a three-dimensional audio playback system.

In some embodiments of the invention, there is provided a computer program product comprising computer-executable components for causing a server computing device to perform an embodiment of the method of the present disclosure when the computer-executable components are run on processing circuitry comprised in the server computing device.

In another aspect, a media server is provided. The media server comprises: a database storing a plurality of songs in both of a three-dimensional format and a non-three-dimensional format; at least one processing device in data communication with the database; and at least one computer readable storage device storing instructions that, when executed by the at least one processing device, cause the media server to: analyze a request for media content; determine, based on one or more factors associated with the request, whether the request originated from a media playback system comprising a three-dimensional audio playback system; and send, to the media playback system, one of: the three-dimensional audio content, and the non-three dimensional audio content, based on the determination.

In accordance with an embodiment of the media server of the present invention, there is provided a media server for a server computing device. The media server comprises a database storing a plurality of songs in both of a three-dimensional format and a non-three-dimensional format. The media server also comprises at least one processing device in data communication with the database. The media server also comprises at least one computer readable storage device storing instructions that, when executed by the at least one processing device, causes the media server to analyze a request for media content. The media server is also caused to determine, based on one or more factors associated with the request, whether the request originated from a media playback system comprising a three-dimensional audio playback system. The media server is also caused to send, to the media playback system, one of: the three-dimensional audio content, and the non-three dimensional audio content, based on the determination.

In yet another aspect, a media playback device is provided. The media playback device comprises: a processing device; and at least one non-transitory computer readable storage device storing instructions that when executed by the processing device, cause the media playback device to: send a request to a media server for media content, the request comprising one of: a request type indicating that the media playback device is connected to the three-dimensional audio playback device, and a request type indicating that the media playback device is not connected to the three-dimensional audio playback device; and receive, based on the request type indication, media content comprising one of: three-dimensional audio content, and non-three dimensional audio content.

In accordance with an embodiment of the media playback device of the present invention, there is provided a media playback device comprising a processing device, and at least one non-transitory computer readable storage device storing instructions that when executed by the processing device, cause the media playback device to send a request to a media server for media content, the request comprising one of: a request type indicating that the media playback device comprises a three-dimensional audio playback system, and a request type indicating that the media playback device does not comprise a three-dimensional audio playback system. The media playback device is also caused to receive, based on the request type indication, media content comprising one of: three-dimensional audio content, and non-three dimensional audio content.

DETAILED DESCRIPTION

Figure 1:
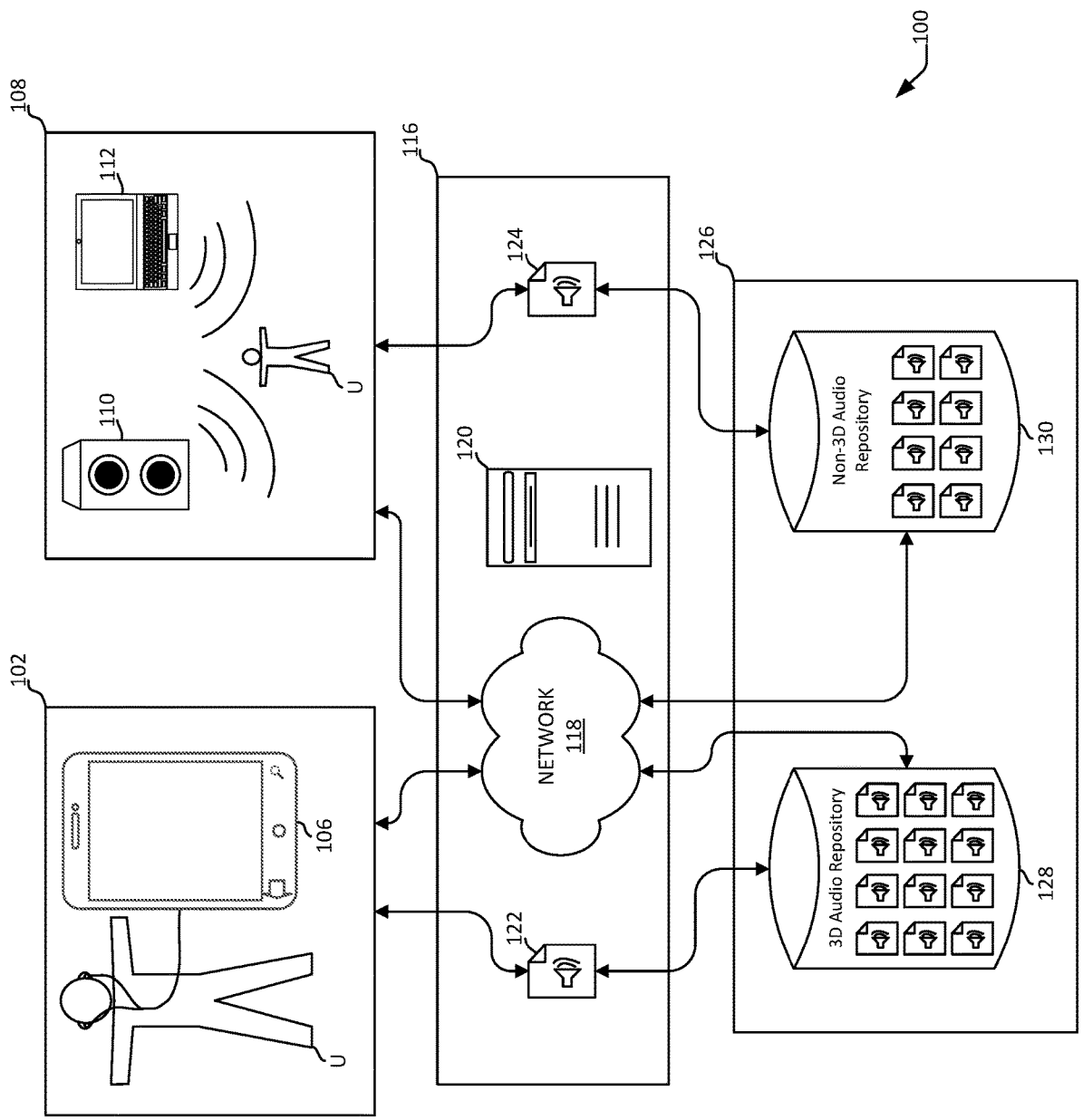
FIG. 1 illustrates an example system for selecting and providing three-dimensional and non-three-dimensional audio content to a media playback system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The perception of spatial sound in the real world is a complex phenomenon. It combines the interactions between acoustic sound waves and a room or space, the interaction with a listener's head and ears, the reaction of a listener's middle and inner ear and the audio nerve, and the brain's cognition and interpretation of an acoustic scene.

Audio recordings have generally been provided to users, via media playback systems (e.g., speakers and headphones; devices associated with speakers and headphones such as tablets, smart phones, CD players, MP3 players, etc.) in a two-channel stereo format, or a multi-channel surround sound format. During two-channel stereo recording, two microphones are placed in strategically chosen locations relative to a sound source, with both recording simultaneously. The two recorded channels are similar, with each having a distinct time-of-arrival, and pressure-level, associated with received sound. During playback of such recordings, a basic illusion of multi-directional audible perspective is generally achieved by using two independent audio channels through a configuration of two or more speakers (or stereo headphones) in such a way as to create the impression of sound heard from two directions. However, conventional stereo recordings fail to give listeners an accurate perception of the location from which audio content originates from in relation to their physical location because those recordings do not factor in natural ear spacing or "head shadow" of the head and ears, as well as other physical factors associated with receiving and processing sound in a three-dimensional environment, since these things happen naturally as a person listens, generating their own interaural time difference and interaural level differences.

Surround sound systems provide a better locational auditory perception to listeners than typical stereo recordings. Surround sound generally describes a technique for enriching the sound reproduction quality of an audio source with additional audio channels from speakers that surround the listener. Surround sound is characterized by a listener location, or sweet spot, where the audio effects work best, and presents a fixed or forward perspective of the sound field to the listener at this location. The technique enhances a listener's ability to identify the location or origin of a detected sound in direction and distance. Typically this is achieved by using multiple discrete audio channels routed to an array of loud speakers, whereby each source channel is mapped to its own loudspeaker. However, like typical stereo recordings, surround sound also fails to provide an accurate perception of sound as it is heard in everyday life. For example, surround sound is hindered by the fact that there are a finite number of places (i.e., speakers) from which sound can be perceived to originate from, and the sound no longer enters a listener's ears unaltered. Instead, it bounces around objects in a three-dimensional listening environment (e.g., walls, chairs, desks, etc.) that is unlike the environment that the sound has been recorded to capture. As such, the sound reverberates off of objects in the environment, leaving sensitive phase information muddled.

In contrast to typical stereo and surround sound systems, three-dimensional audio systems provide a listener with the perception that they are physically present in a three-dimensional environment where audio is being produced, without limiting the listener to a specific sweet spot, as generally required by surround sound systems. Three-dimensional recording (sometimes called binaural recording) takes the stereo recording method one step further by placing two microphones in ear-like cavities on either side of a stand or dummy head in order to capture and process sound most closely to the way it would be heard by human ears, thereby preserving interaural cues. Three-dimensional audio recordings are capable of providing an accurate perception of sound, as heard in the real world, by capturing sound waves as they are modified by a listener's aural anatomy (e.g., the size and shape of the head, ears, ear canal, density of the head, size and shape of nasal and oral cavities, etc.). Thus, three-dimensional audio recording accurately captures the modified soundwaves as they would be heard by a listener, including pitch, tone, loudness, and location modifications, which are commonly referred to as head related transfer functions and HRTF filters. This allows for a listener of three-dimensional audio content to place and perceive different sounds in different three-dimensional locations upon hearing those sounds, even though the sounds may be produced by just two speakers of a pair of headphones.

Three-dimensional audio content can also be created by simulating the soundwave modifications that would occur in a natural sound environment through the application of HRTF filters to standard multi-channel recordings, in order to attempt to replicate non-altered three dimensional recordings. For example, filters that account for natural sound environment factors may comprise filters that adjust soundwaves based on distance, desired sound origination in relation to a listener, head movement of a listener, and a user's aural anatomy, among others. The perceived accuracy of producing such a recording is dependent at least on how much information is available in the original recording (e.g., a multi-track recording with multiple channels can be processed to create a more convincing three-dimensional audio equivalent than a mono-track stereo recording). Such a recording, as referred to herein, is designated as a simulated three-dimensional audio recording, or simulated three-dimensional audio content.

Three-dimensional audio playback can accurately emulate a three-dimensional sound environment when played through headphones. This is typically not the case when a three-dimensional recording is played back by one or more surrounding speakers. For example, when three-dimensional audio recordings are played back through surrounding speakers in a three-dimensional environment, most of the subtlety is lost, and it is difficult to perceive a difference from ordinary stereo sound. Thus, when played over typical surrounding speakers, rather than providing the complex sound visualization of a three-dimensional recording, a listener is instead sensitive to the sound visualization of her three-dimensional environment.

FIG. 1 illustrates an example system 100 for selecting and providing three-dimensional (3D) and non-three-dimensional (non-3D) audio content to a media playback system. The example system 100 includes first user playback environment 102, second user playback environment 108, media content processing and transfer environment 116, and audio content storage environment 126.

First user playback environment 102 includes user U and media playback device 106. User U is wearing headphones that are physically connected to media playback device 106, although it should be understood that user U's headphones may be connected/paired to media playback device 106 via wireless communication (e.g., BlueTooth, WiFi, etc.). The media playback device 106 may comprise any device capable of playing back audio content, stored locally on the media playback device 106 or remotely (e.g., audio content stored on one or more remote computing devices associated with a media streaming service, audio content stored on one or more computing devices associated with a media uploading and/or downloading service, audio content stored on one or more remote computing devices associated with a cloud computing storage service, etc.). For example, the media playback device 106 may comprise devices such as a smart phone, a tablet, a laptop, a desktop, an MP3 player, etc., as well as any of those devices in addition to associated audio producing devices (e.g., speakers that are physically or wirelessly connected, headphones that are physically or wirelessly connected, etc.).

Second user playback environment 108 includes user U, one or more speakers 110, and laptop computing device 112. As shown, the one or more speakers 110 and the laptop computing device 112 are playing audio content, which is being listened to by user U. However, unlike in first user playback environment 102, User U in second user playback environment 108 is listening to audio content without headphones. Thus the audio content (and corresponding sound waves) originating from each of one or more speakers 110 and laptop computing device 112 are provided to user U from a distance rather than being played more directly into the ear canals of user U.

Media content processing and transfer environment 116 includes server computing device 120, network 118, 3D audio content 122, and non-3D audio content 124. Devices associated with each of first user playback environment 102, second user playback environment 108, media content processing and transfer environment 116, and audio content storage environment 126, may communicate with one another via network 118.

Audio content storage environment 126 includes 3D audio repository 128, including a plurality of 3D audio tracks, and non-3D audio repository 130, including a plurality of non-3D audio tracks. According to examples, user U may request, via media playback device 106 and network 118, access to one or more audio tracks comprised in one or both of 3D audio repository 128 and non-3D audio repository 130. The request may be input into a graphical user interface, or language processing software associated with, media playback device 106 in first user playback environment 102 and/or laptop computing device 112 or a computing device associated with one or more speakers 110 in second user playback environment 108. For example, media playback device 106, laptop computing device 112 and a computing device associated with one or more speakers 110 may run a media content streaming application, which provides functionality related to selecting and playing media content, including audio content, which may be stored locally on a media playback device and/or an associated device, or remotely.

The request to access one or more audio tracks, in addition to providing an indication of which audio tracks, files playlists, etc. are requested, may comprise an indication of whether the requesting device and/or a connected device is suitable for playing 3D audio content. For example, a determination may be made by media playback device 106 that headphones are physically connected or wirelessly connected to it, and as such, a further determination may be made that media playback device 106 is connected to a device (the headphones) that is suitable for playing 3D audio content.

According to some examples, the determination of whether a requesting device and/or a connected device is suitable for playing 3D audio may be made by one or more remote computing devices, such as server computing device 120. Thus, in some aspects, media playback device 106 may make the determination of whether it or a connected device is suitable for playing 3D audio, and that information may be transferred to a media server, and in other aspects, media playback device 106 may transfer information about itself and/or other media playback devices associated with it, and a determination of whether it and/or a connected device is suitable for playing 3D audio may be made by one or more remote computing devices, such as server computing device 120.

According to examples, server computing device 120 may comprise a media server and/or a content type selection server. Server computing device 120 may perform one or more operations related to receiving media content requests, determining whether a requesting device or a connected device is suitable for playing 3D audio content, and selecting appropriate media content to transfer to a requesting device, such as media playback device 106.

In some aspects, upon receiving a request for one or more audio tracks from media playback device 106, server computing device 120 may determine, based on information associated with that request, that media playback device 106 is connected to headphones and/or another device that is suitable for playing 3D audio content, and that the media playback system associated with media playback device 106 is therefore suitable for playing 3D audio that will be perceived by a listener as corresponding to a natural sound environment. According to other aspects, that determination may be made based on one or more communications by a media playback system associated with media playback device 106. Accordingly, server computing device 120 may send a request to 3D audio repository 128 for one or more of the audio tracks that were requested by media playback device 106.

Although shown as two remote repositories, 3D audio repository 128 and non-3D audio repository 130 may be maintained jointly on server computing device 120. Additionally, although shown as two separate repositories, 3D audio repository 128 and non-3D audio repository 130 may reside in the same or different storage devices.

Upon receiving a request for one or more 3D audio tracks, 3D audio repository 128, or one or more computing devices associated with 3D audio repository 128, may transfer one or more of the requested audio tracks to media playback device 106. Thus, in exemplary system 100, 3D audio content 122 is sent to media playback device 106, via network 118. According to other examples, 3D audio repository 128 may transfer one or more of the requested 3D audio tracks to one or more intermediary computing devices, such as server computing device 120, which may be subsequently transferred to media playback device 106.

In some examples, rather than transferring 3D audio tracks from 3D audio repository 128 to media playback device 106, requested audio tracks may be transferred from non-3D audio repository 130 to one or more HRTF processing engines and one or more associated computing devices, such as server computing device 120, which may apply one or more HRTF filters to the requested audio tracks, thereby generating simulated 3D audio tracks that are then transferred to media playback device 106. Similarly, rather than transferring 3D audio tracks from 3D audio repository 128 to media playback device 106 and/or applying one or more HRTF filters to the requested audio tracks at one or more HRTF processing computing devices prior to transferring simulated 3D audio tracks to media playback device, requested audio tracks may be transferred from non-3D audio repository 130 to media playback device 106, which subsequently applies one or more HRTF filters to the requested audio tracks, thereby generating simulated 3D audio tracks at media playback device 106.

According to some aspects, user U in second user playback environment 108 may request, via network 118, access to one or more audio tracks comprised in one or both of 3D audio repository 128 and non-3D audio repository 130. The request may be input into laptop computing device 112 or a computing device associated with one or more speakers 110 in second user playback environment 108. For example, laptop computing device 112 and a computing device associated with one or more speakers 110 may run a media content streaming application, which provides functionality related to selecting and playing media content, including audio content, which may be stored locally or remotely in relation to one or more speakers 110 and laptop computing device 112.

The request to access one or more audio tracks, in addition to providing an indication of which audio tracks are requested, may comprise an indication of whether the requesting device and/or a connected device is suitable for playing 3D audio content. For example, an indication may be provided in the request that the requesting device and/or connected playback devices (e.g., one or more speakers 110) are not suitable for 3D audio content playback. In some embodiments, the indication of whether laptop computing device 112, or a computing device associated with one or more speakers 110, in second user playback environment 108 are suitable for playing 3D audio content may be provided to one or more remote computing devices, such as server computing device 120. Thus, in some aspects, laptop computing device 112 and/or one or more devices associated with one or more speakers 110 may make the determination of whether themselves, or one or more connected devices, are suitable for playing 3D audio, and that information may be transferred to media server, such as server computing device 120, while in other aspects laptop computing device 112 and/or one or more devices associated with one or more speakers 110 may transfer information about themselves and/or other media playback devices connected to them, and a determination of whether themselves and/or one or more connected devices are suitable for playing 3D audio may be made by one or more remote computing devices, such as server computing device 120.

Upon receiving a request to access one or more audio tracks from laptop computing device 112 or a device connected to one or more speakers 110, server computing device 120 may determine, based on that request, that neither laptop computing device 112, nor one or more speakers 110, are connected to headphones or another 3D audio optimized playback device, and therefore the requesting device (laptop computing device 112, or one or more speakers 110 and/or a connected device) are not suitable for playing 3D audio content. Accordingly, server computing device 120 may send a request to non-3D audio repository 130 for one or more of the audio tracks that were requested by the requesting device (laptop computing device 112 or one or more speakers 110 and/or a connected device).

Upon receiving a request for one or more non-3D audio tracks, non-3D audio repository 130, or one or more computing devices associated with non-3D audio repository 130, may transfer one or more of the requested audio tracks to the requesting device. Thus, in exemplary system 100, non-3D audio track 124 is sent to the requesting device in second user playback environment 108 via network 118. According to other examples, non-3D audio repository 130 may transfer one or more of the requested non-3D audio tracks to one or more intermediary computing devices, such as server computing device 120, which may be subsequently transferred to the requesting device in second user playback environment 108.

According to some examples, one or more movement-determining devices may be physically and/or wirelessly connected to an audio requesting device. For example, headphones connected to media playback device 106 may comprise one or more accelerometer for detecting a change in location. Thus, when connected to media playback device 106, and worn on user U, headphones comprising one or more accelerometer may provide an indication to media playback device 106, and/or one or more remote computing devices (e.g., server computing device 120), regarding user U's head position and movement. As such, when 3D audio content is being played by media playback device 106 in such a scenario, one or more filters may be applied to the 3D audio content at media playback device 106 and/or one or more remote computing devices (e.g., server computing device 120) to compensate for a determined change in user U's head location. For example, one or more HRTF filters may be automatically applied to 3D audio content being played by media playback device 106 when a change in user U's head location is determined to have occurred, such that the 3D audio content being played provides an accurate perception of what the audio being played would sound like if user U were present and moving her head in the same manner during the recording of the audio. According to examples, compensating filters that may be applied in such a scenario may include one or more of: a timing filter, a loudness filter, and a timbre filter.

Although the examples described herein use accelerometers, in other embodiments other types of movement-determining devices are used. A movement-determining device is a device that operates to capture measurements related to movement of the media playback device 106 and/or an associated device (e.g., headphones, a headband, virtual reality headgear, etc.). An accelerometer is an example of a movement-determining device.

An accelerometer is a device that is used to measure acceleration, including gravitational acceleration. In some embodiments, an accelerometer measures acceleration in a single direction. In other embodiments, an accelerometer measures acceleration in more than one direction, such as in three directions. In some embodiments, the orientation of an accelerometer is inferred by comparing the measured direction and magnitude of acceleration to an expected direction and magnitude of gravitational acceleration. Additionally, in some embodiments, the movement of one or more accelerometers and/or a user's head may be inferred from one or more measured acceleration values.

In some examples, a set of accelerometers may be implemented in determining a change in a user's head location. For example, an X accelerometer, a Y accelerometer, and a Z accelerometer may be implemented. In such examples, an X accelerometer may operate to measure acceleration in the horizontal direction relative to a user's head location, a Y accelerometer may operate to measure acceleration in a vertical direction relative to a user's head location, and a Z accelerometer may operate to measure acceleration in a front-to-back direction relative to a user's head location. In some embodiments, an accelerometer set may be implemented that includes three or more accelerometers that each operate to measure acceleration in three orthogonal directions (i.e., each of the three directions is pairwise perpendicular to the other two directions). In this manner one or more accelerometers may operate to determine and/or provide data such that a determination can be reached regarding acceleration in three-dimensional space.

Figure 2:
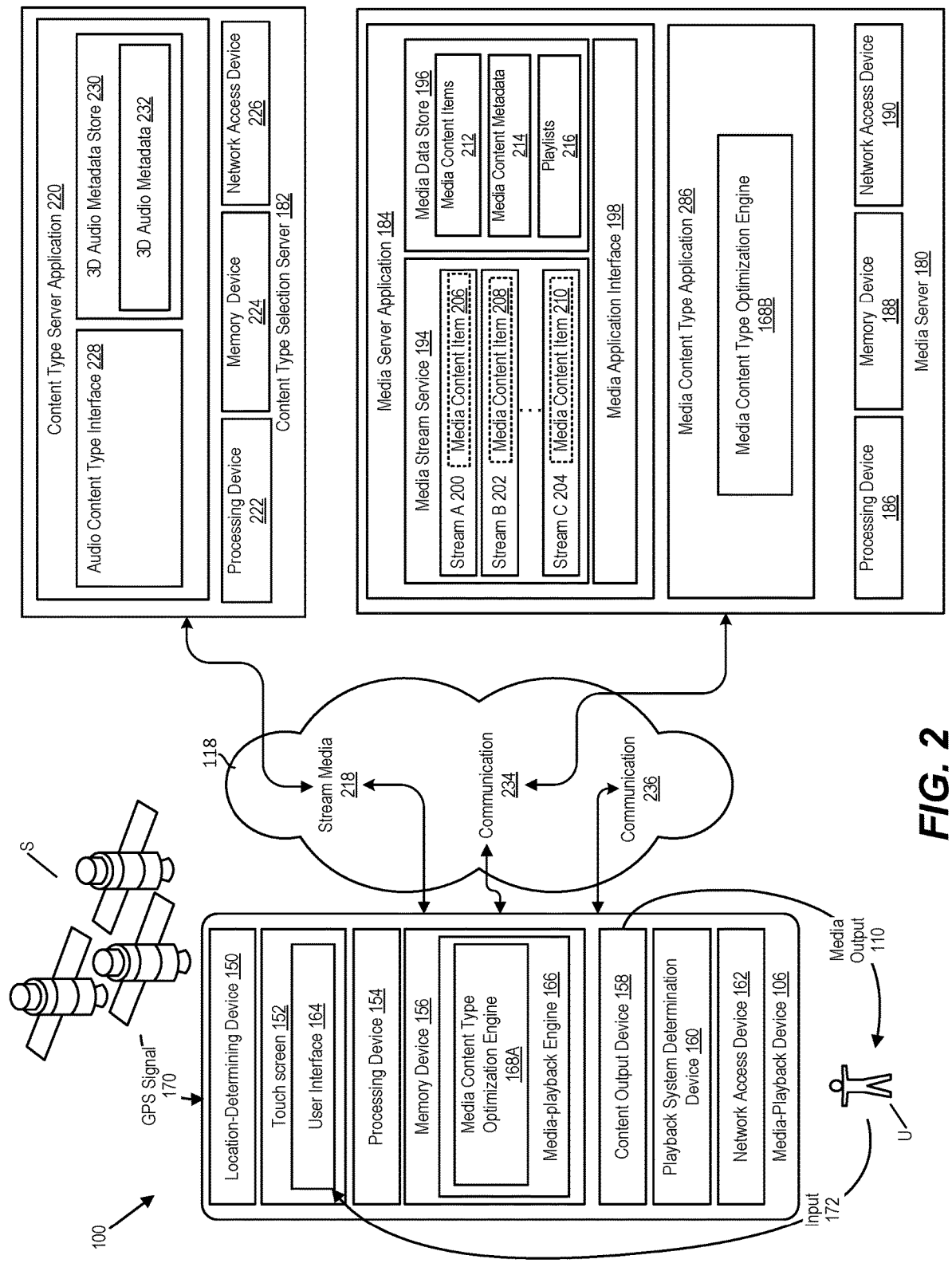
FIG. 2 is a schematic illustration of the example system of FIG. 1 for selecting and providing three-dimensional and non-three dimensional audio content to a media playback system.

FIG. 2 is a schematic illustration of the example system of FIG. 1 for selecting and providing three-dimensional and non-three-dimensional audio content to a media playback system. In FIG. 2, the media playback device 106, server computing device 120 (including media server 180 and content type selection server 182), and the network 118 are shown. Also shown are the user U and satellites S.

As noted above, the media playback device 106 and/or one or more connected devices operate to play media content comprising 3D audio content and non-3D audio content. In some embodiments, the media playback device 106 operates to play media content items that are provided (e.g., streamed, transmitted, etc.) by a system external to the media playback device 106 such as media server 180 and/or content type selection server 182, another system, or a peer device, which may be comprised of server computing device 120. Alternatively, in some embodiments, the media playback device 106 operates to play media content stored locally on the media playback device 106. Further, in at least some embodiments, the media playback device 106 operates to play media content that is stored locally as well as media content provided by other systems and devices.

In some embodiments, the media playback device 106 is a computing device, handheld entertainment device, smartphone, tablet, watch, wearable device, or any other type of device capable of playing media content. In yet other embodiments, the media playback device 106 is a laptop computer (e.g., laptop computing device 112), desktop computer, television, gaming console, set-top box, network appliance, blue-ray or DVD player, media player, stereo, or radio. In some examples the media playback device 106 may be connected, physically and/or wirelessly, to one or more audio producing devices such as one or more speakers 110.

In at least some embodiments, the media playback device 106 includes a location-determining device 150, a touch screen 152, a processing device 154, a memory device 156, a content output device 158, a playback system determination device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media playback device 106. In some embodiments, the location-determining device 150 uses one or more of the following technologies: Global Positioning System (GPS) technology which may receive GPS signals 170 from satellites S, cellular triangulation technology, network-based location identification technology, WiFi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media playback device 106. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a media content type optimization engine 168A. In some embodiments, the media-playback engine 166 operates to playback media content and the media content type optimization engine 168A operates to apply one or more HRTF filters to audio content that is being played back or that is stored for future playback. For example, if media playback device 106 or an associated device are determined to be suitable for 3D audio playback, but audio content that is being played back by the media playback device 106, or that is stored on media playback device 106 for future playback, is not in a 3D format, media content type optimization engine 168A may apply one or more HRTF filters to one or more corresponding non-3D audio tracks in order to play those tracks in a 3D audio format. Additionally, media content type optimization engine 168A may receive an indication that user U's head position has changed (e.g., receive information from or related to movement detection devices connected to media playback device 106), and apply one or more HRTF filters to one or more 3D audio tracks prior to or during playback of those tracks by the media playback device 106.

The memory device 156 typically includes at least some form of computer-readable media. Computer readable media includes any available media that can be accessed by the media playback device 106. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media playback device 106. In some embodiments, computer readable storage media is non-transitory computer readable storage media.

Computer readable communication media as described herein embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The playback system determination device 160 operates to determine whether the media playback device 106, or a connected device, is suitable for playing back 3D audio content. In some examples, the playback system determination device 160 may send an indication of whether the media playback device 106 or a connected device is suitable for playing back 3D audio content to a media content server (e.g., server computing device 120). In at least some examples, the playback system determination device 160 operates to determine whether headphones are physically or wirelessly connected to media playback device 106, and thus suitable for playing back 3D audio content. In other examples, the playback system determination device 160 operates to determine whether a user has provided input into media playback device 106, or a device connected to media playback device 106, indicating that media playback device 106 is or is not suitable for playing back 3D audio.

The network access device 162 operates to communicate with other computing devices over one or more networks, such as network 118. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 118 is an electronic communication network that facilitates communication between the media playback device 106 and remote devices associated with media content selection, processing, and delivery, including content type selection server 182, media server 180, and the devices depicted in the various environments of FIG. 1. An electronic communication network includes a set of computing devices and links between the computing devices. The computing devices in the network 118 use the links to enable communication among the computing devices in the network 118. The network 118 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 118 includes various types of links. For example, the network 118 can include wired and/or wireless links, including Bluetooth, ultra-wideband (UWB), 802.11, ZigBee, cellular, and other types of wireless links. Furthermore, in various embodiments, the network 118 is implemented at various scales. For example, the network 118 can be implemented as one or more local area networks (LANs), metropolitan area networks, subnets, wide area networks (such as the Internet), or can be implemented at another scale. Further, in some embodiments, the network 118 includes multiple networks, which may be of the same type or of multiple different types.

In at least some embodiments, the media server 180 and the content type selection server 182 are provided by separate computing devices. In other embodiments, the media server 180 and the content type selection server 182 are provided by the same computing devices. Further, in some embodiments, one or both of the media server 180 and the content type selection server 182 are provided by multiple computing devices. For example, the media server 180 and the content type selection server 182 may be provided by multiple redundant servers located in multiple geographic locations.

The media server 180 operates to transmit stream media 218 to media-playback devices such as the media playback device 106. In some embodiments, the media server 180 includes a media server application 184, a media content type optimization engine 168B, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media playback devices or other systems, to retrieve media content items from the media server 180. For example, in FIG. 2, the media application interface 198 receives communication 234 from the media playback device 106.

In some embodiments, the media data store 196 stores media content items 212, media content metadata 214, and playlists 216. The media data store 196 may comprise one or more databases and file systems (e.g., 3D audio repository 128, non-3D audio repository 130, etc.). Other embodiments are possible as well. As noted above, the media content items 212 may be audio, video, or any other type of media content, which may be stored in any format for storing media content.

Media content items 206, 208, and 210 may comprise 3D audio content items or non-3D audio content items. For example, one or more of media content items 206, 208 and 210 may be stored in 3D audio repository 128 and comprise 3D audio content as discussed above. Similarly, one or more of media content items 206, 208 and 210 may be stored in non-3D audio repository 130 and comprise non-3D audio content as also discussed above.

The memory device 188 operates to store data and instructions. In some embodiments, the memory device 188 stores instructions for a media content type application that includes a media content type optimization engine 168B. In some embodiments, the media content type application 286 receives communications from the media playback device 106 and/or the content type selection server regarding requested media content, and the media content type optimization engine 168B operates to apply one or more HRTF filters to audio content. For example, if a determination is made that media playback device 106 has requested one or more audio tracks, and media playback device or an associated device is suitable for playing 3D audio, but that one or more of the requested audio tracks is not stored in a 3D format (e.g., stored in media data store 196 in a 3D format), media content type optimization engine 168B may apply one or more HRTF filters to one or more corresponding non-3D audio tracks in order to transfer and/or stream those audio tracks to the media playback device 106 in a 3D audio format. Additionally, media content type optimization engine 168 may receive an indication that user U's head position has changed, and apply one or more HRTF filters to one or more 3D audio tracks prior to or during transfer and/or streaming of those tracks to the media playback device 106.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The content type selection server 182 operates to provide audio content type—specific information about media content items to media-playback devices. In some embodiments, the content type selection server 182 includes a content type server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, content type server application 220 operates to analyze a request for audio content from media playback device 106, and determine, based on one or more factors included in that request, whether media playback device 106 is suitable for playing 3D audio content. The content type server application 220 includes a 3D audio content type interface 228, and a 3D audio metadata store 230.

The audio content type interface 228 operates to receive requests or other communication from media playback devices or other systems. For example, the audio content type interface 228 may receive communication from the media-playback engine 166. Such requests and communications may include an indication that a requesting device is suitable, or is not suitable, for playing 3D audio content. The audio content type interface 228 may also analyze requests for audio content from media playback devices and retrieve information about requested audio content items from the content type selection server and/or the media server 180. For example, upon making a determination that a requesting media playback device (or a connected device) is suitable for 3D audio content playback, the audio content type interface 228 may determine whether one or more requested audio tracks are available in a 3D format for transfer back to the requesting media playback device.

In some embodiments, the 3D audio metadata store 230 stores 3D audio metadata 232. The 3D audio metadata store 230 may comprise one or more databases and file systems. Other embodiments are possible as well.

The 3D audio metadata 232 operates to provide various information associated with media content items, such as the media content items 212. In some embodiments, the 3D audio metadata 232 provides information that may be useful for selecting media content items for playback by a media playback device or an associated device that is determined to be suitable for playing 3D audio content. For example, in some embodiments, the 3D audio metadata 232 stores information related to whether specific media content items are available for transfer back to a media playback device as 3D audio. According to some embodiments, the 3D audio metadata 232 may provide an indication that specific audio content in the media data store 196 is maintained in a 3D audio format. In other embodiments, the 3D audio metadata 232 may provide an indication that specific audio content in the media data store 196 is not maintained in a 3D audio format. In still other embodiments, the 3D audio metadata 232 may provide an indication that a specific audio track in the media data store 196, although not stored in a 3D audio format, may be streamed or otherwise transferred to a media playback device in a 3D audio format after one or more HRTF filters have been applied to it. According to yet other embodiments, the 3D audio metadata 232 may provide an indication that certain portions of a specific audio content in the media data store 196 are maintained in a 3D audio format, while other portions are not. The 3D audio metadata 232 may also provide an indication of the size of specific audio content, in both its 3D audio format and its non-3D audio format.

Each of the media playback device 106, the media server 180, and the content type selection server 182 may include additional physical computer or hardware resources. In at least some embodiments, the media playback device 106 communicates with the media server 180 and the content type selection server 182 via network 118.

Although in FIG. 2 only a single media playback device 106, a single media server 180, and a single content type selection server 182, are shown, in accordance with some embodiments, the media server 180 and the content type selection server 182 can support a plurality of media playback devices and associated communications and requests, and the media playback device 106 can simultaneously access media content from a plurality of media servers and content type selection servers. Additionally, although FIG. 2 illustrates a streaming media-based system for media content selection, other embodiments are possible as well. For example, in some embodiments, the media playback device 106 includes a media data store 196 (i.e., media content that is stored locally on the media playback device 106) and the media playback device 106 is configured to perform media content selection and/or HRTF filtering. Further in some embodiments, the media playback device 106 may operate to store previously streamed media content items in a local media data store.

In at least some embodiments, one, both, or the combination of the media server 180 and the content type selection server 182, can be used to stream, progressively download, or otherwise communicate music, other audio, video, or other forms of media content items to the media playback device 106 based on a request for media content and/or a communicated indication of whether the media playback device 106 or an associated/connected device is suitable for playing 3D audio content.

In accordance with an embodiment, a user U can direct the input 172 to the user interface 164 to issue requests, for example, to playback media content corresponding to one or more audio tracks and/or a format in which such requested tracks are desired (e.g., 3D audio format, non-3D audio format). For example, although the media playback device 106 or an associated device (e.g., connected headphones) may be suitable for playing 3D audio, user U may nonetheless request that non-3D audio formatted tracks be requested due to factors such as network streaming speeds, network streaming cost, and available storage on the media playback device 106, among others.

Figure 3:
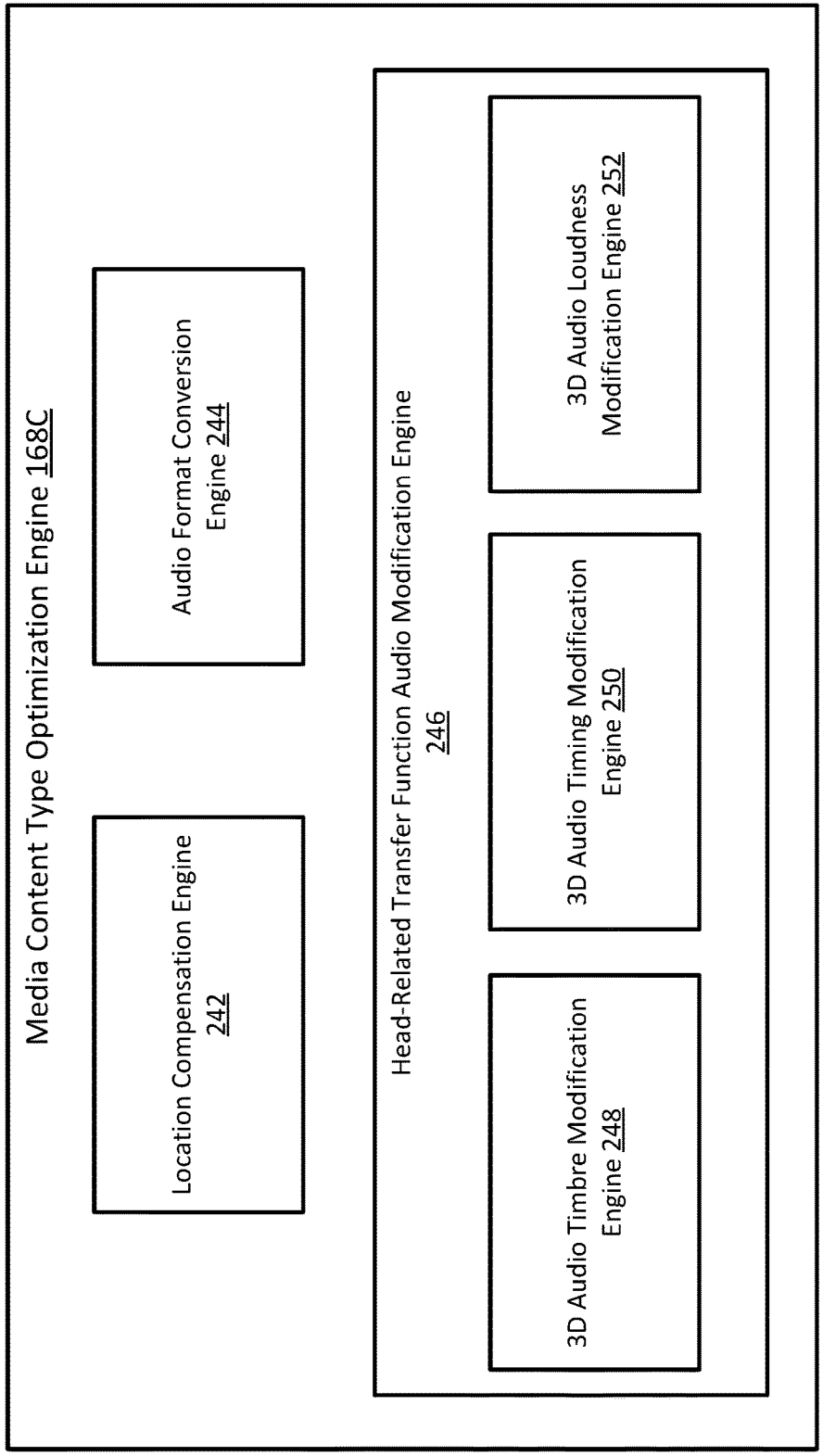
FIG. 3 is a schematic block diagram of the media content type optimization engine shown in FIG. 2.

FIG. 3 is a schematic block diagram of the media content type optimization engine 168C, which may reside in media playback device 106 (i.e., media content type optimization engine 168A), media server 180 (i.e., media content type optimization engine 168B), or both media playback device 106 and media server 180. Media content type optimization engine 168C includes location compensation engine 242, audio format conversion engine 244, head-related transfer function audio modification engine 246, 3D audio timbre modification engine 248, 3D audio timing modification engine 250, and 3D audio loudness modification engine 252.

According to some embodiments, media content type optimization engine 168C may include more or fewer engines related to location compensation and/or audio format conversion. In additional embodiments, one or more of the engines shown in media content type optimization engine 168C may be comprised within media playback device 106, while the same or different engines shown in media content type optimization engine 168C may be comprised within media server 180. In other embodiments, one or more of the engines shown in media content type optimization engine 168C may be comprised within a computing device other than media playback device 106 and media server 180.

Location compensation engine 242 may perform one or more operations related to receiving location and movement information associated with one or more devices located on or near a user that is listening to audio content played by the media playback device 106, and determining whether one or more HRTF filters should be applied or modified in relation to 3D audio content being played. For example, location compensation engine 242 may receive location and movement information from headphones connected to the media playback device 106 (e.g., accelerometer information), determining from that information that a user's head location has changed, and as such, determining that one or more compensating HRTF filters should be applied or modified with regard to 3D audio content being played by the media playback device 106.

Audio format conversion engine 244, when comprised within the media playback device 106, may perform one or more operations related to determining that one or more audio tracks being played back or stored by the media playback device 106 are in a non-3D format, determining that media playback device 106 or an associated device is suitable for playing 3D audio content, and determining that one or more HRTF filters should be applied to the one or more audio tracks to convert them from a non-3D audio format to a simulated 3D audio format. Similarly, audio format conversion engine 244, when comprised within a remote computing device such as media server 180, may perform one or more operations related to determining that one or more audio tracks being transferred, streamed, or requested, by the media playback device 106 are stored in a non-3D format, determining or receiving a determination that media playback device 106 or an associated device is suitable for playing 3D audio content, and determining that one or more HRTF filters should be applied to the one or more audio tracks to convert them from a non-3D audio format to a simulated 3D audio format.

Head-related transfer function audio modification engine 246 comprises 3D audio timbre modification engine 248, 3D audio timing modification engine 250, and 3D audio loudness modification engine 252. According to examples, head-related transfer function audio modification engine 246 may receive an indication from location compensation engine 242 that one or more HRTF filters should be applied to 3D audio content currently being played, streamed or otherwise transferred to the media playback device 106. That indication may be analyzed by head-related transfer function audio modification engine 246 and a determination as to whether one or more channels of the 3D audio content should be processed by one or more of the 3D audio timbre modification engine 248, the 3D audio timing modification engine 250, and the 3D audio loudness modification engine 252, in order to compensate for detected user head movement (e.g., detected head movement as determined from movement/accelerometer sensors in headphones connected to the media playback device 106), should be applied in order to create an accurate perception of what the 3D content would sound like in a 3D environment if the user moved her head in a 3D listening environment.

In some examples, a determination may be made that one or more channels of the 3D audio content should be processed by the 3D audio timbre modification engine 248 because the head (as well as other body parts) deflect sound in different manners based on where sound originates from, and the head's location relative to, that origination point, and thus the sound's frequency spectrum from one side of the head to the other is modified based on a user's head movement. Thus, a determination may be made to modify one or more channels and their corresponding frequencies in order to change the timbre of the 3D audio content, thereby compensating for a perceived frequency change relative to a user's head movement. Such a modification may be achieved via processing of one or more channels of the 3D audio content by the 3D audio timbre modification engine.

In other examples, a determination may be made that one or more channels of the 3D audio content should be processed by the 3D audio timing modification engine 250 because, for example, sound originating from the left arrives first to the left ear and microseconds later to the right ear. Thus, a determination may be made to modify one or more channels and their corresponding timing, thereby compensating for a perceived timing change relative to a user's head movement. Such a modification may be achieved via processing of one or more channels of the 3D audio content by the 3D audio timing modification engine 250.

In additional examples, a determination may be made that one or more channels of the 3D audio content should be processed by the 3D audio loudness modification engine 252 because the head muffles sound. For example, sound originating from the left side of a user's head is perceived to be louder to the left ear than to the right ear. Thus, a determination may be made to modify one or more channels and their corresponding loudness, thereby compensating for a perceived loudness change relative to a user's head movement. Such a modification may be achieved via processing of one or more channels of the 3D audio content by the 3D audio loudness modification engine 252.

Figure 4:
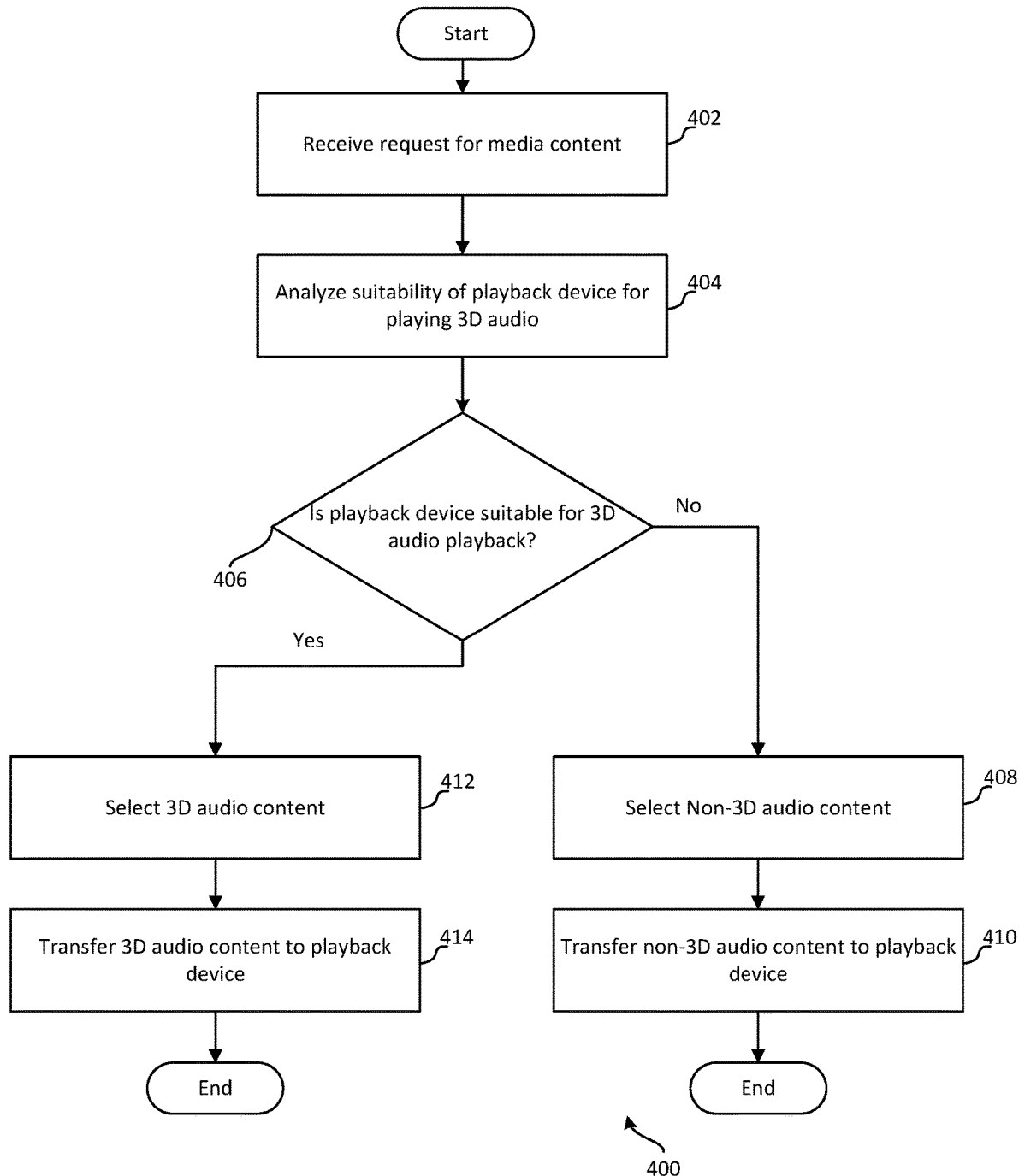
FIG. 4 illustrates an example method for selecting and transferring audio content to a media playback device in an appropriate format based on the media playback device's suitability for playing three-dimensional audio content.

FIG. 4 illustrates an example method 400 for selecting and transferring audio content to the media playback device 106 in an appropriate format based on the media playback device's suitability (or an associated device's suitability) for playing 3D audio content. Although described in relation to selecting and transferring audio content from one or more computing device remote from the media playback device 106 (e.g., remote computing devices such as media server 180 and content type selection server 182), it should be understood in line with this disclosure that audio content may be selected directly from the media playback device 106 in the case that one or more audio tracks matching an input request for audio are stored locally on the media playback device 106.

The method 400 begins at a start operation and flow continues to operation 402 where a request for media content is received by one or more remote computing devices such as media server 180 and/or content type selection server 182. For example, a user may input a request into the media playback device 106 to access one or more audio tracks, including individual audio tracks and/or a playlist, and that request may be transferred via network 118 to the media server 180 and/or content type selection server 182. According to examples, such a request may include an indication of whether the media playback device 106, or an associated device, is suitable for playing 3D audio.

From operation 402 flow continues to operation 404 where the indication of whether the media playback device 106 and/or an associated device is suitable for playing 3D audio is analyzed, and flow continues to operation 406.

At operation 406, a determination is made, based on the received indication of whether the media playback device 106 and/or an associated device is suitable for playing 3D audio, as to whether the media playback device is suitable for playing 3D audio content. If a determination is made at operation 406 that the media playback device 106 and/or an associated device is not suitable for playing 3D audio, flow continues to operation 408, where non-3D audio content corresponding to the input request to access audio content is selected, and at operation 410 the selected non-3D audio content is transferred, via network 118, to the media playback device 106.

Alternatively, if a determination is made at operation 406 that the media playback device 106 and/or an associated device is suitable for playing 3D audio, flow continues to operation 412, where 3D audio content corresponding to the input request to access audio content is selected, and at operation 414 the selected 3D audio content is transferred, via network 118, to the media playback device 106.

Figure 5:
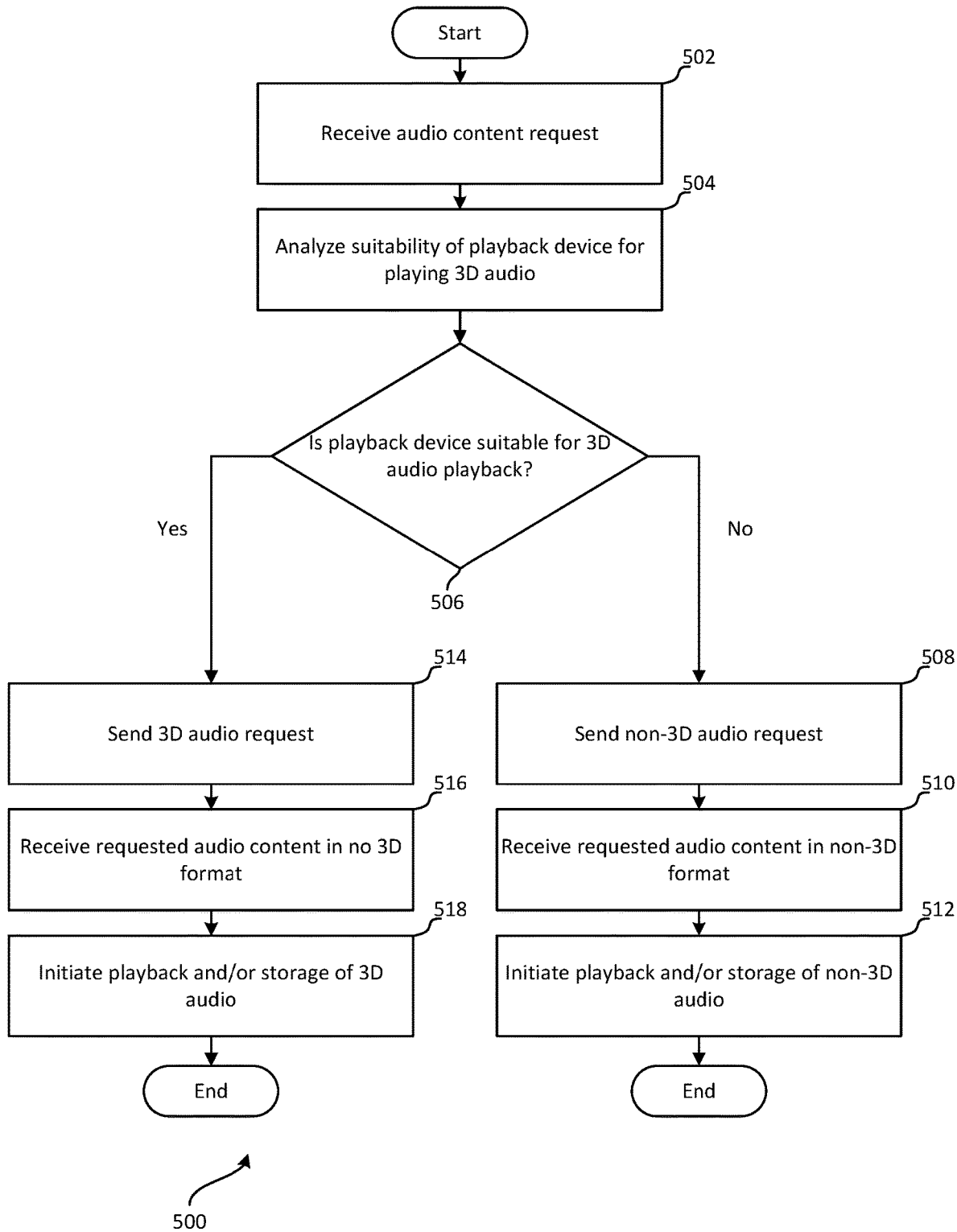
FIG. 5 illustrates an example method for sending a request to access audio content from a media playback device to one or more remote computing devices, and receiving corresponding audio content in an appropriate format based on the media playback device's suitability for playing three-dimensional audio content.

FIG. 5 illustrates an example method 500 for sending a request to access audio content from the media playback device 106 to one or more remote computing devices (e.g., media server 180 and/or content type selection server 182), and receiving corresponding audio content in an appropriate format based on the media playback device's suitability (or an associated device's suitability) for playing 3D audio content. Although described in relation to receiving audio content from one or more remote computing devices, such as media server 180 and/or content type selection server 182), it should be understood in line with this disclosure that audio content corresponding to the input request may be stored locally on the media playback device 106, and as such, the corresponding audio content may be received directly from storage on the media playback device (e.g., memory device 156).

The method 500 begins at a start operation and moves to operation 502 where a request to access audio content is received. For example, a user may input, via a graphical user interface, speech recognition software, etc., a request to access audio content comprising one or more songs, one or more podcasts, one or more playlists, etc. From operation 502, flow continues to operation 504.

At operation 504 the suitability of the media playback device 106 and/or an associated device may be analyzed. For example, the one or more 3D audio suitability factors may include: a determination that headphones are physically plugged into the media playback device 106; headphones are wirelessly paired with the media playback device 106 and audio content will be played by the wirelessly connected headphones when it is selected for streaming/playback; user input indicating that the media playback device 106 or an associated device are suitable for 3D audio playback; user input indicating that the media playback device 106 or an associated device are not suitable for 3D audio playback; user input indicating that regardless of whether the media playback device 106 or an associated device are suitable for 3D audio playback, that 3D audio content is nonetheless desired or not desired, etc.

From operation 504 flow continues to operation 506 where a determination is made as to whether the media playback device 106 and/or an associated device are suitable for playing 3D audio. For example, one or more of the 3D audio suitability factors described above may be assessed and a determination may be made based on those one or more factors as to whether the media playback device 106 is suitable for 3D audio playback. According to some aspects, one or more of the 3D audio suitability factors may have a value assigned to them which corresponds to a likelihood that the media playback device 106 is suitable for playing 3D audio. According to other aspects, one or more of the 3D audio suitability factors may dictate the determination of whether the media playback device 106 is suitable for playing 3D audio (e.g., user input indicating that 3D audio is not desired may dictate a determination that the media playback device 106 is not suitable for 3D audio playback, user input indicating that 3D audio is desired may dictate a determination that the media playback device is suitable for 3D audio playback, etc.). According to some examples the values associated with the 3D audio suitability factors may be summed or otherwise combined and a determination may be made as to whether a 3D playback threshold is met (i.e., whether the media playback device 106 and/or an associated device are suitable for playing 3D audio).

If a determination is made at operation 506 that the media playback device and/or an associated device are not suitable for playing 3D audio, flow continues to operation 508, where a request for non-3D audio is sent from the media playback device 106 to one or more computing devices (e.g., media server 180 and/or content type selection server 182), which may process the request as described above in relation to at least FIG. 2.

From operation 510 flow continues to operation 510 where the media playback device 106 receives the requested audio content in a non-3D format, and flow moves to operation 512 where the media playback device 106 initiates playback and/or storing of the received non-3D audio. From operation 512, the method 500 moves to an end operation and the method 500 ends.

Alternatively, if a determination is made at operation 506 that the media playback device and/or an associated device are suitable for playing 3D audio, flow continues to operation 514, where a request for 3D audio is sent from the media playback device 106 to one or more computing devices (e.g., media server 180 and/or content type selection server 182), which may process the request as described in relation to at least FIG. 2.

From operation 514, flow continues to operation 516 where the media playback device 106 receives the requested audio content in a 3D format, and flow moves to operation 518 where the media playback device 106 initiates playback and/or storing of the received 3D audio. From operation 518, the method 500 moves to an end operation and the method 500 ends.

Figure 6:
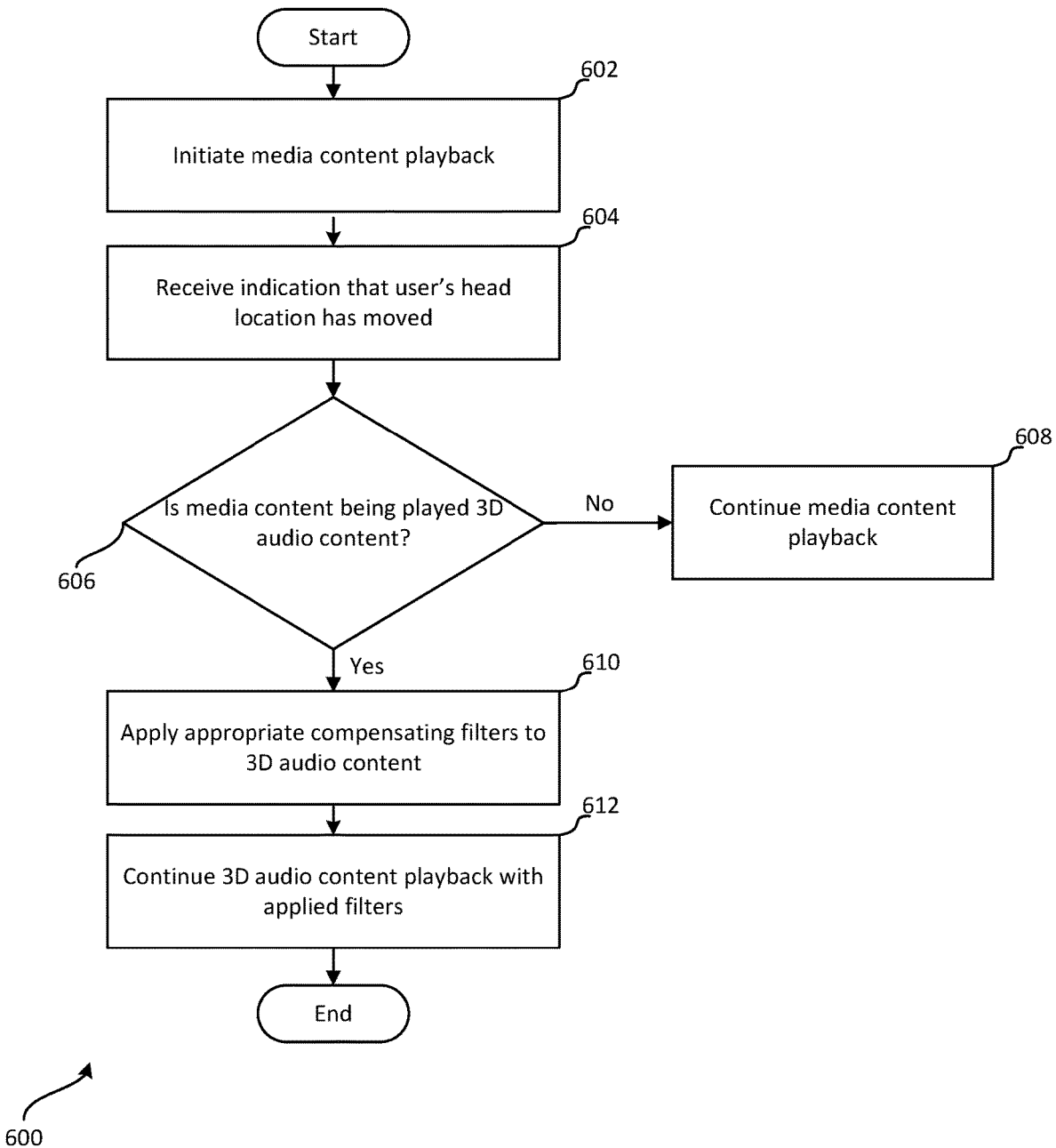
FIG. 6 illustrates an example method for adjusting one or more filters of three-dimensional audio content based on determined listener head movement.

FIG. 6 illustrates an example method 600 for adjusting one or more filters of 3D audio based on determined listener head movement. The method 600 begins at a start operation and moves to operation 602 where the media playback device 106 has received audio content and has initiated playback of that audio content.

From operation 602 flow continues to operation 604 where an indication that a user/listener's head location has moved. For example, a movement detection device (e.g., headphones that incorporate accelerometers) associated with the media playback device 106 may provide an indication to the media playback device and/or media server 180 and/or content type selection server 182 that a change in the user's head location has likely occurred. That is, user head movement in any direction may occur and the movement detection device may provide corresponding feedback to the media playback device 106, media server 180 and/or content type selection server 182.

From operation 604 flow continues to operation 606 where a determination as to whether the audio content being played is 3D audio content. The determination of whether the audio content being played is 3D audio content may be made at the media playback device 106 and/or a remote computing device such as media server 180 and/or content type selection server 182.

If a determination is made at operation 606 that the audio content being played is not 3D audio content, flow continues to operation 608 where the audio content continues to play without modification. Alternatively, if a determination is made at operation 606 that the audio content being played is 3D audio content, flow continues to operation 610.

At operation 610 one or more filters are applied to the audio content being played to compensate for the determined change in the user's head location. For example, one or more HRTF filters may be applied to the audio content by a media content type optimization engine that may reside within the media playback device 106 and/or a remote computing device such as media server 180. Thus one or more HRTF filters may be applied to the 3D audio content being played, including: one or more audio timbre filter, one or more 3D audio timing filter, and one or more 3D audio loudness filter, in order to compensate for the user's determined head movement as more fully described above with respect to the discussion of FIG. 3.

From operation 610, flow continues to operation 612 where playback of the 3D audio content continues with the applied filters in place. From operation 610 the method 600 continues to an end operation and the method 600 ends.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

Below follows an itemized list of example embodiments of the present invention.

1. A method for providing media content to a media playback system, the method comprising:
  receiving, from the media playback system, a request for media content;
  determining, based on one or more factors associated with the request, whether the media playback system comprises a three-dimensional audio playback system;
  sending, to the media playback system, three-dimensional audio content when the media playback system is determined to comprise a three-dimensional audio playback system; and
  sending, to the media playback system, non-three-dimensional audio content when the media playback system is not determined to comprise a three-dimensional audio playback system.
2. The method of item 1, wherein determining whether the media playback system comprises a three-dimensional audio playback system comprises determining whether the media playback system comprises headphones.
3. The method of item 2, wherein upon determining that the media playback system comprises headphones, sending the three-dimensional audio content to the media playback system.
4. The method of item 2, wherein upon determining that the media playback system does not comprise headphones, sending the non-three-dimensional audio content to the media playback system.
5. The method of item 1, wherein at least one of the one or more factors provides an indication that headphones are one of: physically connected to a device associated with the media playback system, and wirelessly connected to a device associated with the media playback system.
6. The method of item 1, wherein the three-dimensional content comprises an audio recording that has been modified with at least one head-related transfer function.
7. The method of item 1, wherein the three-dimensional content comprises a binaural audio recording.
8. The method of item 3, wherein the headphones are integrated with at least one movement-determining sensor.
9. The method of item 8, wherein the at least one movement-determining sensor comprises an accelerometer.

10. The method of item 8, further comprising:
   receiving, from the at least one movement-determining sensor, an indication that a change in the headphones' location has occurred; and
   in response to the received indication, automatically adjusting at least one filter applied to the three-dimensional audio content, the at least one filter selected from: a timing filter, a loudness filter, and a timbre filter.
11. The method of item 1, determining whether the media playback system comprises a three-dimensional audio playback system further comprises:
   associating a three-dimensional playback value with each of the one or more factors; and
   determining, from a combined three-dimensional playback value for the one or more factors, whether a three-dimensional playback threshold is met.
12. A media server comprising:
   a database storing a plurality of songs in both of a three-dimensional format and a non-three-dimensional format;
   at least one processing device in data communication with the database; and
   at least one computer readable storage device storing instructions that, when executed by the at least one processing device, cause the media server to:
   analyze a request for media content;
   determine, based on one or more factors associated with the request, whether the request originated from a media playback system comprising a three-dimensional audio playback system; and
   send, to the media playback system, one of: the three-dimensional audio content, and the non-three dimensional audio content, based on the determination.
13. The media server of item 12, wherein determining whether the request originated from a media playback system comprising a three-dimensional audio playback system comprises determining whether the media playback system comprises headphones.
14. The media server of item 13, wherein upon determining that the media playback system comprises headphones, the instructions are further executable by the at least one processing device, to cause the media server to:
   send the three-dimensional audio content to the media playback system.
15. The media server of item 13, wherein upon determining that the media playback system does not comprise headphones, the instructions are further executable by the at least one processing device, to cause the media server to:
   send the non-three dimensional audio content to the media playback system.
16. A media playback device comprising:
   a processing device; and
   at least one non-transitory computer readable storage device storing instructions that when executed by the processing device, cause the media playback device to:
   send a request to a media server for media content, the request comprising one of: a request type indicating that the media playback device is connected to the three-dimensional audio playback device, and a request type indicating that the media playback device is not connected to the three-dimensional audio playback device; and
   receive, based on the request type indication, media content comprising one of: three-dimensional audio content, and non-three dimensional audio content.
17. The media playback device of item 16, wherein the request comprises one or more factors that indicate that the media playback device is connected to headphones, and wherein the media playback device receives three-dimensional audio content based on the one or more factors meeting a three-dimensional audio content playback threshold.
18. The media playback device of item 17, wherein at least one of the one or more factors provides an indication that headphones are physically connected to the media playback device.
19. The media playback device of item 17, wherein at least one of the one or more factors provides an indication that headphones are wirelessly connected to the media playback device.
20. The media playback device of item 16, wherein the request comprises one or more factors that indicate that the media playback device is not connected to headphones, and wherein, the media playback receives non-three-dimensional audio content based on the one or more factors not meeting a three-dimensional audio content playback threshold.

The invention claimed is:

1. A method performed by a server computing device for providing media content to a media playback system comprising a media playback device, the method comprising:
   storing each of a plurality of media content items in both a three-dimensional audio format and a non-three dimensional audio format;
   receiving, from the media playback system, a request for one or more media content items from the plurality of media content items;
   determining, based on one or more factors associated with the request, whether the media playback system is suitable for playing the one or more media content items in the three-dimensional audio format; and
   upon determining that the media playback system is suitable for playing the one or more media content items in the three-dimensional audio format,
      determining a head position of a user of the media playback device;
      based on the head position, automatically applying a timing filter to one or more channels of the one or more media content items in the three-dimensional audio format to compensate for perceived timing changes relative to the user's head position; and
      sending, to the media playback system, the requested one or more media content items in the three-dimensional audio format with the timing filter applied.
2. The method of claim 1, further comprising:
   upon determining that the media playback system is not suitable for playing the one or more media content items in the three-dimensional audio format, sending, to the media playback system, the requested one or more media content items in the non-three-dimensional audio format.
3. The method of claim 1, wherein the determining whether the media playback system is suitable for playing the one or more media content items in the three-dimensional audio format comprises determining that the media playback system comprises headphones.
4. The method of claim 3, wherein at least one of the one or more factors provides an indication that the headphones are one of: physically connected to the media playback device, and wirelessly connected to the media playback device.
5. The method of claim 3, wherein the headphones are integrated with at least one movement-determining sensor.

6. The method of claim 5, further comprising:
receiving, from the at least one movement-determining sensor, an indication that a change in the headphones' location has occurred; and
in response to the received indication, automatically adjusting at least one filter applied to the one or more media content items in the three-dimensional audio format, the at least one filter selected from: the timing filter, a loudness filter, and a timbre filter.

7. The method of claim 5, wherein the at least one movement-determining sensor comprises an accelerometer.

8. The method of claim 1, wherein the determining whether the media playback system comprises is suitable for playing the one or more media content items in the three-dimensional audio format comprises determining that the media playback system does not comprise headphones, and
wherein upon determining that the media playback system does not comprise headphones, the method further comprises sending the one or more media content items in the non-three-dimensional audio format to the media playback system.

9. The method of claim 1, wherein the one or more media content items in the three-dimensional audio format comprises an audio recording that has been modified with at least one head-related transfer function.

10. The method of claim 1, wherein the determining whether the media playback system is suitable for playing the one or more media content items in the three-dimensional audio format further comprises:
associating a three-dimensional playback value with each of the one or more factors; and
determining, from a combination of the three-dimensional playback values for the one or more factors, whether a three-dimensional playback threshold is met.

11. The method of claim 1, wherein the three-dimensional audio format is based on the aural anatomy of the user of the media playback device.

12. A media server comprising:
a database storing a plurality of media content items in both a three-dimensional audio format and a non-three-dimensional audio format;
at least one processing device in data communication with the database; and
at least one non-transitory computer readable storage device storing instructions that, when executed by the at least one processing device, cause the media server to:
analyze a request from a media playback system for one or more media content items;
determine, based on one or more factors associated with the request, whether the media playback system is suitable for playing the one or more media content items in the three-dimensional audio format; and
upon determining that the media playback system is suitable for playing the one or more media content items in the three-dimensional audio format,
determine a head position of a user of the media playback system;
based on the head position, automatically apply a timing filter to one or more channels of the one or more media content items in the three-dimensional audio format to compensate for perceived timing changes relative to the user's head position; and
send, to the media playback system, the one or more media content items in the three-dimensional audio format with the timing filter applied.

13. The media server of claim 12, further comprising:
upon determining that the media playback system is not suitable for playing the one or more media content items in the three-dimensional audio format, send, to the media playback system, the one or more media content items in the non-three dimensional audio format.

14. The media server of claim 12, wherein determining whether the media playback system is suitable for playing the one or more media content items in the three-dimensional audio format further comprises determining whether the media playback system comprises headphones.

15. The media server of claim 12, wherein the application of the timing filter to the one or more media content items in the three-dimensional audio format is based on the aural anatomy of the user of the media playback system.

16. A media playback device comprising:
at least one processing device; and
at least one non-transitory computer readable storage device storing instructions that, when executed by the at least one processing device, cause the media playback device to:
send a request to a media server for one or more media content items from a repository that stores a plurality of media content items in both a three-dimensional audio format and a non-three-dimensional audio format, the request comprising one of: a request type indicating that the media playback device comprises a three-dimensional audio playback system, and a request type indicating that the media playback device does not comprise a three-dimensional audio playback system; and
when the request type indicates that the media playback device is suitable for playing the one or more media content items in the three-dimensional audio format,
receive the requested one or more media content items in the three-dimensional audio format;
determine a head position of a user of the media playback device; and
based on the head position, automatically apply a timing filter to one or more channels of the one or more media content items in the three-dimensional audio format.

17. The media playback device of claim 16, wherein the instructions further cause the media playback device to:
when the request type indicates that the media playback device is not suitable for playing the one or more media content items in the three-dimensional audio format, receive the requested one or more media content items in the non-three dimensional audio format.

18. The media playback device of claim 16, wherein the request comprises one or more factors that indicate that the media playback device is connected to headphones, and wherein the media playback device receives the one or more media content items in the three-dimensional audio format based on the one or more factors.

19. The media playback device of claim 18, wherein at least one of the one or more factors provides an indication that headphones are physically or wirelessly connected to the media playback device.

20. The media playback device of claim 16, wherein the three-dimensional audio is based on the aural anatomy of the user of the media playback device.

* * * * *